United States Patent
Schoeny (10) Patent No.: US 10,179,511 B2
(45) Date of Patent: Jan. 15, 2019

(54) HARVESTER ELECTRICAL ENERGY GENERATION

(71) Applicant: Deere and Company, Moline, IL (US)

(72) Inventor: Jacob G. Schoeny, Bettendorf, IA (US)

(73) Assignee: Deere & Company, Moline, IL (US)

( * ) Notice: Subject to any disclaimer, the term of this patent is extended or adjusted under 35 U.S.C. 154(b) by 22 days.

(21) Appl. No.: 15/435,060

(22) Filed: Feb. 16, 2017

(65) Prior Publication Data

US 2018/0229607 A1    Aug. 16, 2018

(51) Int. Cl.
*A01F 12/44*    (2006.01)
*B60L 1/00*    (2006.01)
*A01D 69/02*    (2006.01)

(52) U.S. Cl.
CPC .............. *B60L 1/20* (2013.01); *A01D 69/02* (2013.01); *A01F 12/448* (2013.01)

(58) Field of Classification Search
CPC .... A01D 45/023; A01D 45/025; A01D 75/00; A01D 69/02; A01F 12/34; A01F 12/446; A01F 12/448; G01B 21/10; G01B 3/38; G01B 5/0035; G01B 5/08; B60L 1/20
USPC ................ 460/5, 72, 101, 109, 97
See application file for complete search history.

(56) References Cited

U.S. PATENT DOCUMENTS

| 6,632,136 | B2 * | 10/2003 | Anderson | A01F 12/448 460/101 |
| 6,672,957 | B2 * | 1/2004 | Voss | A01F 12/448 460/101 |
| 9,258,945 | B2 * | 2/2016 | Pearson | A01F 12/446 |
| 2014/0262547 | A1 | 9/2014 | Acheson et al. | |
| 2015/0319929 | A1 | 11/2015 | Hendrickson et al. | |
| 2016/0113199 | A1 | 4/2016 | Jongmans et al. | |

FOREIGN PATENT DOCUMENTS

| DE | 2419361 | 10/1975 |
| DE | 202012008136 | 10/2012 |
| EP | 1238580 | 9/2002 |
| EP | 2976936 | 1/2016 |

OTHER PUBLICATIONS

EP search report for EP 18156074 dated Apr. 26, 2018.

* cited by examiner

*Primary Examiner* — Robert E Pezzuto
(74) *Attorney, Agent, or Firm* — Rathe Lindenbaum LLP (57) ABSTRACT

A harvester may include a reciprocating member to engage a crop, an electrical generator to convert reciprocating motion of the reciprocating member into electrical energy and an electrical storage unit storing the electrical energy. The harvester may include a first movable member to engage a crop, an electrical generator at least partially carried by the first movable member to generate electrical energy from movement of the first movable member, a second movable member carried by the first movable member and an actuator to drive movement of the second movable member using the electrical energy.

20 Claims, 7 Drawing Sheets

HARVESTER ELECTRICAL ENERGY GENERATION

BACKGROUND

Harvesters are utilized to gather crops from a growing medium. Such harvesters often include members that move and engage the crop being harvested. For example, many harvesters include cleaning mechanisms that reciprocate to thresh or separate grain from straw and chaff. The cleaning mechanisms include louvers that are themselves movable.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Harvesters include multiple moving members or components that engage the crop being harvested. The movement of such members may make the delivery of power to such members challenging. The movement of such members may further make communication with such members challenging.

Disclosed herein are examples of a harvester that utilizes the motion of the moving members to locally generate electrical energy. Because the generation of the electrical energy is local, on or adjacent to the moving member or members, electrical wiring otherwise needed to provide local electrical energy is reduced or eliminated. The local generation of electrical energy is especially beneficial for powering secondary movable members that are themselves carried by the moving members that are used to generate the electrical energy. The local generation of electric energy is especially beneficial for powering the operational setting adjustment of the secondary movable members carried by the moving members, the motion of which is used to generate the elliptical energy.

Disclosed herein is an example harvester that comprises a reciprocating member to engage a crop, an electrical generator to convert reciprocating motion of the reciprocating member into electrical energy and an electrical storage unit storing the electrical energy.

Disclosed herein is an example harvester that comprises a first movable member to engage a crop, an electrical generator at least partially carried by the first movable member to generate electrical energy from movement of the first movable member, a second movable member carried by the first movable member and an actuator to drive movement of the second movable member using the electrical energy.

Disclosed herein is an example method that comprises moving a first movable member of a harvester to interact with the crop, generating electrical energy from conversion of motion of the first movable member and moving a second movable member carried by the first movable member using the generated electrical energy.

Figure 1:
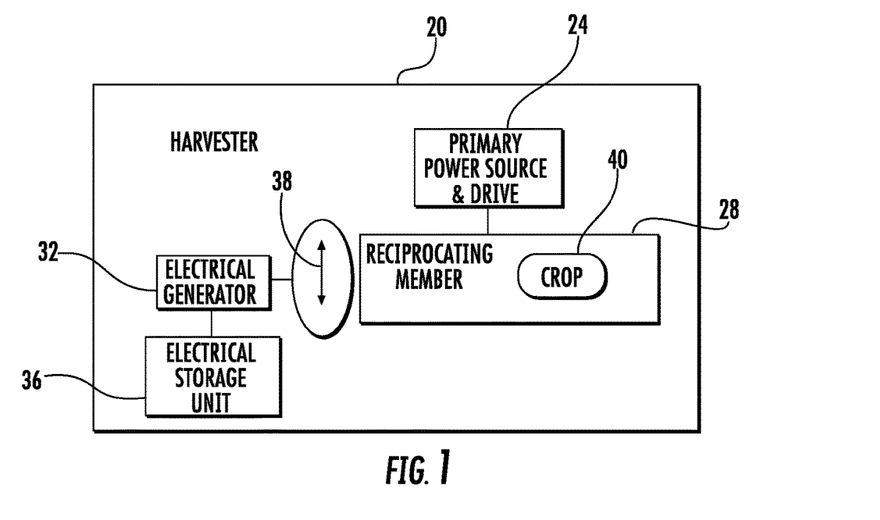
FIG. 1 is a schematic diagram of an example harvester providing local electrical power generation.

FIG. 1 is a schematic diagram of an example harvester 20. Harvester 20 utilizes the motion of the moving members to locally generate electrical energy. Harvester 20 comprises: primary power source and drive 24, reciprocating member 28, electrical generator 32 and electrical storage unit 36.

Primary power source and drive 24 comprises a primary mover and associated drive or transmission operably coupled to reciprocating member 28 so as to drive reciprocating member 28. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

In one implementation, primary power source and drive 24 may comprise a primary mover such as an internal combustion engine operably coupled to reciprocating drive 28 by various transmission elements such as gear trains, belt and pulley arrangements, chain and sprocket arrangements, hydraulic or pneumatic transmission components or the like are selectively drive reciprocating member 28. In other implementations, primary power source and drive 20 more may comprise a primary mover such as an electric motor and an associated transmission that converts rotation of the electric motor into translational movement so as to reciprocate member 28. In yet other implementations, primary power source and drive 24 may have other configurations.

Reciprocating member 28 comprises a member of harvester 20 that reciprocates or moves back and forth in a linear fashion, as illustrated by arrows 38 while in engagement with, in contact with or interacting with crops 40 (schematically illustrated). In other implementations, such reciprocating, back and forth, motion may be along a circular path or along an arc. In one implementation, reciprocating member 28 comprises a cleaning mechanism that facilitates the separation of chaff, stocks and the like of plants from the fruit or grain bearing portion of the plants. In one implementation, recess getting member 28 comprises a chief or sieve. In other implementations, reciprocating member 28 may comprise other members that have a reciprocating motion and that interact with the crop.

Electrical generator 32 comprises a device or system that captures and converts the reciprocating motion 38 of reciprocating member 28 into electrical energy. In one implementation, electrical generator 32 is partially carried by reciprocating member 28, wherein electrical generator 32 comprises a magnet and electrically conductive coil, wherein one of the magnet and the electrically conductive coil is carried by the reciprocating member 28 and the other of the magnet and the electrically conductive coil is supported by a frame or other structure of harvester 20 that is stationary relative to reciprocating member 28 as reciprocating member 28 is reciprocating. In yet another implementation, electrical generator 32 is completely carried and supported by reciprocating member 28. For example, in one implementation, electrical generator 32 comprises a magnet and an electrically conductive coil, both of which are carried and supported by reciprocating member 28, wherein one of the magnet and electrically conductive coil is movable relative to the other of the magnet and the electrically conductive coil in response to momentum of the reciprocating forces resulting from the reciprocation of member 28 in the direction indicated by arrows 38. In some implementations, such reciprocation may occur along an arc.

Electrical storage unit 36 comprises at least one device that locally stores the electrical energy or electric power generated by electrical generator 32. The term "local" refers to the relative positioning of a member or mechanism relative to reciprocating member 28. In other words, a component that is identified as being local or the "local" generation of electrical power refers to the close proximity of the component to reciprocating member 28 or the close proximity of the location at which electrical power is generated to the reciprocating member 28. Electrical storage unit 36 is local with respect to reciprocating member 28.

In one implementation, electrical storage unit 36 comprises a rechargeable battery. The electrical power or energy stored by electric storage unit 36 may be used to power local components of harvester 22, those components that are remote from the power source of primary power source and drive 24, but which are local to reciprocating member 28. For example, in one implementation, the electrical energy stored by electrical storage unit 36 may be used to power other movable members or mechanisms not supported by reciprocating member 28, in the vicinity of reciprocating member 28. In one implementation, electric energy stored by electrical storage unit 36 may be used to power movable members or mechanisms that are carried by reciprocating member 28.

In some implementations, such movable members or mechanisms carried by reciprocating member 28 may be difficult to connect to and supply power to due to the movement of reciprocating member 28. In such implementations, electrical generator 32 and electric storage unit 36 may also be carried by reciprocating member 28, facilitating direct connection to such movable members and avoiding the challenges associated with providing electrical power across a moving interface or juncture between reciprocating member 28 and the surrounding portions of harvester 20.

Figure 2:
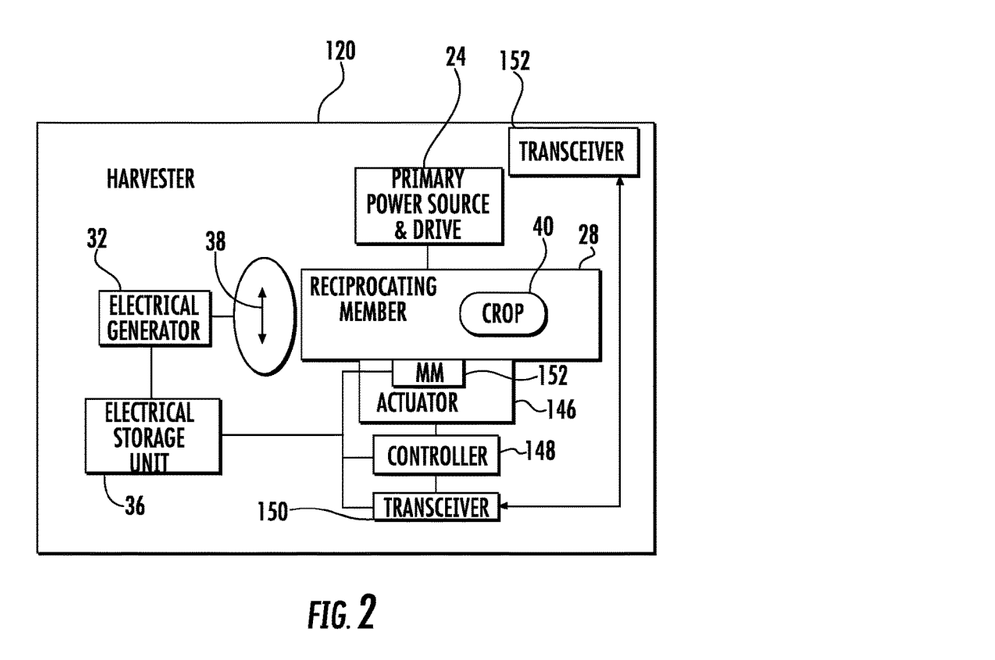
FIG. 2 is a schematic diagram of another example harvester providing local electrical power generation.

FIG. 2 is a schematic diagram of another example harvester 120. Harvester 120 is similar to harvester 20 except that harvester 120 is specifically illustrated as additionally comprising actuator 146, controller 148 and transceiver 150. Those remaining components of harvester 120 which correspond to components of harvester 20 are numbered similarly.

Actuator 146 comprises a device that adjusts an operating parameter of reciprocating member 28. In the example illustrated, actuator 146 comprises a movable member 152 that is driven by actuator 146. In the example illustrated, the movable member 152 of actuator 146 is powered and driven using the energy from electrical storage unit 36. In one implementation, actuator 146 operates in a cyclical or automatic fashion. In another implementation, actuator 146 changes between different states so as to drive member 152 in different fashions in response to control signals from controller 148.

Controller 148 comprises electronics that control the operation of actuator 146. In one implementation, controller 148 comprises an integrated circuit, such as an application-specific integrated circuit that carries out logic in controlling actuator 146 to change an operational parameter or state of reciprocating member 28. In one implementation, controller 148 comprises computer hardware, such as a processing unit and associated instructions stored in a non-transitory computerize readable medium, wherein the instructions direct the processing unit to output control signals to actuator 146, causing actuator 146 to move will member 152 in various selected manner so as to adjust the operational state are parameter of reciprocating member 28. In one implementation, controller 148 receives and utilizes the locally generated electrical energy stored in electrical storage unit 36. In some implementations, controller 148 may be omitted.

Transceiver 150 comprises a communication device that facilitates communication between controller 148 and a remote transceiver, such as transceiver 152. Transceiver 150 facilitates the transmission of commands, inputs or selections from a remote location, such as from a cab or control counsel associated with harvester 120. In one implementation, transceiver 150 further facilitates the transmission of sensor signals indicating various operational states of other components of harvester 120, environmental conditions or characteristics of the grain or crop being harvested. In one implementation, transceiver 150 comprises a wireless transceiver, facilitating the transmission of such controller data signals. In implementations where actuator 146, controller 148 and transceiver 150 are carried by reciprocating member 28, such wireless transmission provided by transceiver 150 facilitates communication between controller 148 and transceiver 152 across the dynamic gap adjacent reciprocating member 28. In one implementation, transceiver 150 is electrically connected to electric storage unit 36 so as to receive and utilize the locally generated electrical power stored in a storage unit 36. In some implementations, transceiver 150 may comprise a wired transceiver or may be omitted.

Figure 3:
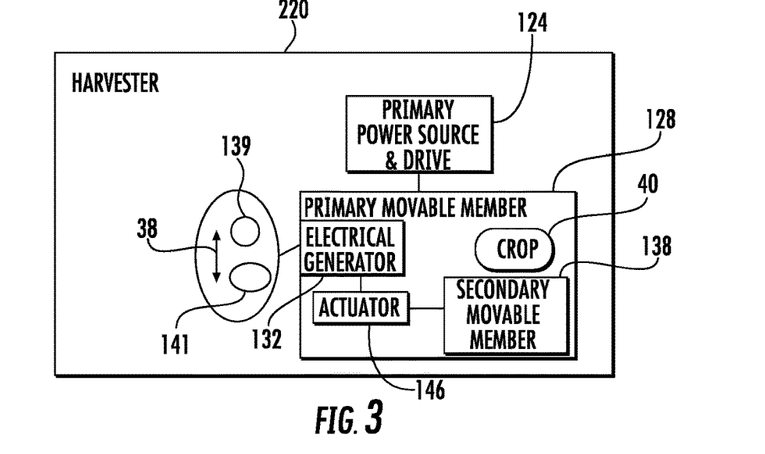
FIG. 3 is a schematic diagram of another example harvester providing local electrical power generation.

FIG. 3 is a schematic diagram of another example harvester 220. Like harvesters 20 and 120, harvester 220 locally generates electrical power from the existing motion of local components of the harvester to power local power consuming components. Harvester 220 comprises primary power source and drive 124, primary movable member 128, electrical generator 132, secondary movable member 138 and actuator 146.

Primary power source and drive 124 is similar to primary power source and drive 24 described above except that power source and drive 124 more generally move primary movable member 128. Such movement may be reciprocating linear movement as indicated by arrows 38, unidirectional or reciprocating rotational movement as schematically indicated by arrows 139, unidirectional or reciprocating elliptical motion as indicated by arrows 141, or other motion. As with power source and drive 24, power source and drive 124 may comprise an internal combustion engine or an electric motor operably coupled to primary movable member 128 by an appropriate transmission. Power source and drive 124 is not entirely carried by primary movable member 128. In one implementation, the primary mover (internal combustion engine or electric motor) is not carried by primary movable member 128, but is operably coupled to removal member 128 by a transmission.

Primary movable member 128 comprises a member that is moved using force or motion supplied by the primary mover of primary power source and drive 124. Primary movable member 128 engages, contacts or otherwise interacts with crop 40 (schematically illustrated). Examples of crop 40 include, but are not limited to, wheat, corn, soybeans, oats and the like. As described above, in one implementation, primary movable member 128 may comprise a member that is reciprocated in a linear fashion, back and forth, such as a cleaning member like a sieve or chafer. In other implementations, primary movable member 128 may comprise a member that is continuously rotated in a single direction either along a circular path or an elliptical path. In yet another implementation, primary movable member 128 may comprise a member that is reciprocated back and forth either along a circular path or an elliptical path.

Electrical generator 132 is similar to electric generator 32 described above except that electric generator 132 captures and converts any of motion 38, 139, 141 into electrical energy. Electrical generator 132 is at least partially carried by primary movable member 128. In one implementation, electrical generator 132 is completely or entirely carried by primary movable member 128, not being physically connected to any other component of harvester 220 relative to which primary movable member 128 moves. In one implementation, both the magnet and the electrical coil used in the generator are supported and carried by primary movable member 128. In such an implementation, because political generator 132 is contained entirely primary movable member 128, joints or bearings may be eliminated or the complexities may be reduced. In addition, challenges to maintaining the appropriate spacing between the magnet and electrically conductive coils or windings, as when one of the magnet and electrically gifted coils are on the moving member 128 and the other of the magnet and electrically conductive coils are on the surroundings frame of harvester 220, are overcome or reduced.

Secondary movable member 138 comprises a movable member carried by primary movable member 128. In one implementation, primary movable member 128 is movable in a first fashion while secondary movable member 138 is movable in a second different manner. In one implementation, primary movable member 128 may move at a first frequency or under a first torque or force whereas secondary movable member 128 they move at a second different frequency or under a second torque or force.

Because a secondary movable member 138 is carried by primary movable member 128, supplying power to the second movable member 138 or two and actuator that moves the second removal member 138 may be challenging. In one implementation, primary movable member 128 may comprise a cleaning mechanism such as a chafer or sieve, wherein the secondary movable member comprises a component of the cleaning mechanism, chafer or sieve, such as louvers. Such an implementation, cleaning mechanism may reciprocate back and forth, whereas the louvers may be rotatable to different louver opening states.

Actuator 146 comprises a device carried by primary mover 128 and operably coupled to secondary movable member 138. In one implementation, actuator 146 receives and utilizes the locally generated electrical power provided by electrical generator 132, either directly or from an electrical storage unit 36 (shown in FIG. 2) carried by member 128 and storing electric power generated by generator 132. In one implementation, actuator 146 comprises an electric solenoid which linearly translates a portion of secondary movable member 138. For example, in one implementation, actuator 146 may comprise electric solenoid that moves a bar that rotates wires or rods so as to rotate the louvers of a cleaning mechanism of harvester 220. In other implementations, actuator 146 may comprise other electrically powered actuators that generate motion that is transmitted to secondary movable member 138 to adjust an operating state of secondary movable member 138 and of primary movable member 128.

Figure 4:
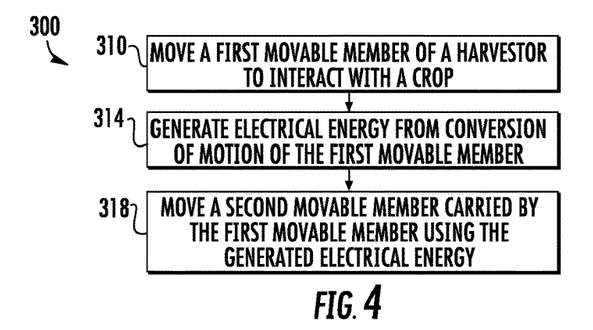
FIG. 4 is a flow diagram of an example method for providing local electric power generation on a harvester and utilizing the locally generated power.

FIG. 4 is a flow diagram of an example method 300 for locally generating electrical power on a harvester and using the locally generating electrical power. Method 300 locally generates a power by converting motion of a movable member into electrical energy. Although method 300 is described as being carried out with respect to harvester 220, method 300 may be carried out with other harvesters.

As indicated by block 310, a first movable member, such as primary movable member number 128, of harvester 220 is moved so as to interact with a crop 40. For example, in one implementation which the primary movable member number 128 comprises cleaning mechanism, such as a sieve or chafer, the sieve or chafer may be reciprocated to facilitate separation of grain from chaff or material other than grain.

As indicated by block 314, electrical generator 132 converts the motion of primary movable member 128 into electrical energy. The conversion of motion of primary movable member 128 into electrical energy may be achieved by moving one of a magnet and electrically conductive coil relative to the other of the other of the magnet and the electrically conductive coil, wherein electric current is produced in the electrically conductive coil is stored in a rechargeable battery for subsequent use or is directly transmitted to a device being powered. In one implementation, electrical generator 132 is completely carried by primary movable member 128. In another implementation of electric generator 132 is partially carried by primary movable member 128 and partially supported by a framework of harvester 220 adjacent to movable member 128.

As indicated by block 318, a second movable member, such as secondary movable member 138, carried by the first movable member, carried by primary movable member 128, is moved using the locally generated electrical energy. For example, in one implementation, the second removal member 138 may comprise louvers carried by the reciprocating framework of the chaffer or sieve, wherein the louvers are rotatable between different positions. The locally generated electrical energy produced by the electrical generator 132 may be utilized to power and actuator to drive rotation of the louvers between the different positions.

Figure 5:
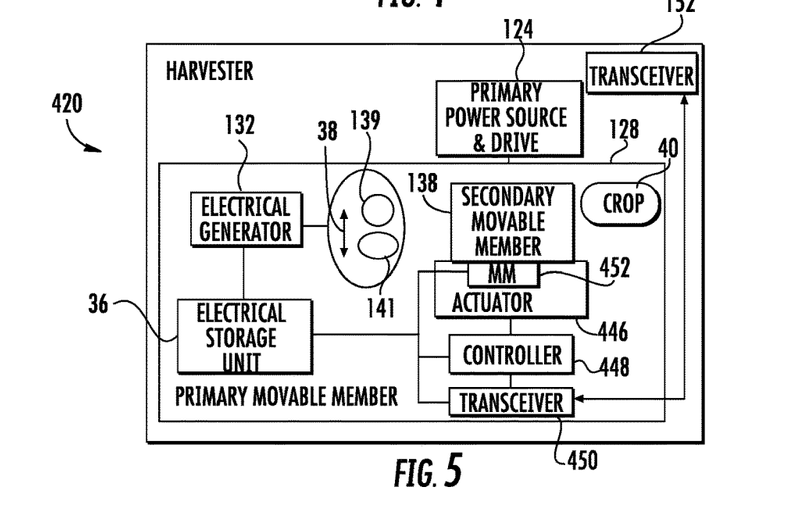
FIG. 5 is a schematic diagram of another example harvester providing local electrical power generation.

FIG. 5 is a schematic diagram of another example harvester 420. Harvester 420 is similar to harvester 220 described above except that harvester 120 is specifically illustrated as additionally comprising actuator 446, controller 448 and transceiver 450. Those remaining components of harvester 420 which correspond to components of harvester 220 are numbered similarly.

Actuator 446 comprises a device that adjusts an operating parameter of secondary movable member 138. Actuator 446 is completely carried and supported by movable member 128 so as to move with the movement of movable member 128. In the example illustrated, actuator 446 comprises a movable member 452 that is driven by actuator 446. In the example illustrated, the movable member 452 of actuator 446 is powered and driven using the energy from electrical storage unit 36. In one implementation, actuator 146 operates in a cyclical or automatic fashion. In another implementation, actuator 446 changes between different states so as to drive member 452 in different fashions in response to control signals from controller 448.

Controller 448 comprises electronics that control the operation of actuator 446. Controller 448 is completely carried and supported by primary movable member 128 so as to move with the movement of primary movable member 128. In one implementation, controller 448 comprises an integrated circuit, such as an application-specific integrated circuit that carries out logic in controlling actuator 446 to change an operational parameter or state of secondary movable member 128. In one implementation, controller 448 comprises computer hardware, such as a processing unit and associated instructions stored in a non-transitory computerize readable medium, wherein the instructions direct the processing unit to output control signals to actuator 446, causing actuator 446 to movable member 452 in various selected manner so as to adjust the operational state are parameter of reciprocating member 28. In one implementation, controller 448 receives and utilizes the locally generated electrical energy stored in electrical storage unit 36. In some implementations, controller 448 may be omitted.

Transceiver 450 comprises a communication device that facilitates communication between controller 448 and a remote transceiver, such as transceiver 152. Transceiver 450 facilitates the transmission of commands, inputs or selections from a remote location, such as from a cab or control counsel associated with harvester 420. In one implementation, transceiver 150 further facilitates the transmission of sensor signals indicating various operational states of other components of harvester 420, environmental conditions or characteristics of the grain or crop being harvested. In one implementation, transceiver 450 comprises a wireless transceiver, facilitating the transmission of such controller data signals. Such wireless transmission provided by transceiver 450 facilitates communication between controller 448 and transceiver 452 across the dynamic gap adjacent reciprocating member 128. In one implementation, transceiver 450 is electrically connected to electrical storage unit 36 so as to receive and utilize the locally generated electrical power stored in a storage unit 36. In some implementations, transceiver 450 may comprise a wired transceiver or may be omitted.

Figure 6:
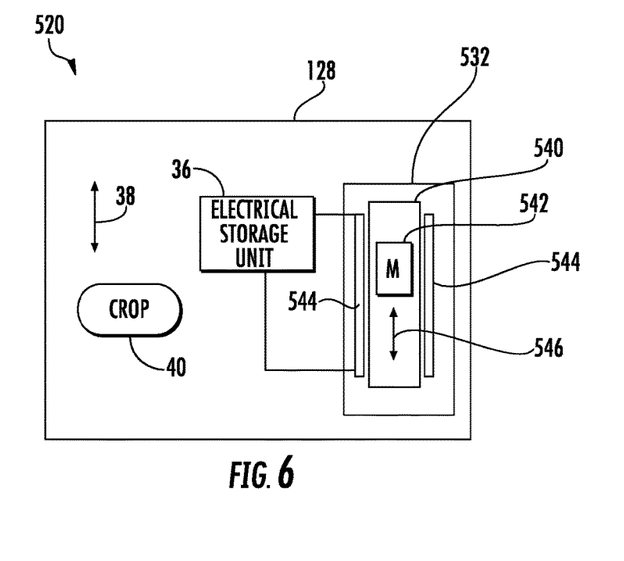
FIG. 6 is a schematic diagram of another example harvester with an example electrical generator.

FIG. 6 is a schematic diagram of a portion of another harvester 520 comprising an example electrical generator 532. Electrical generator 522 may be utilized in place of electrical generator 32 or 132 in any of the above described harvesters. In the example illustrated, electrical generator 532 is illustrated as being wholly supported upon and carried by movable member 128, wherein movable member 128 is to be reciprocated by primary power source and drive 124 in the direction indicated by arrows 38 as described above and wherein the electrical energy provided by generator 532 is stored in the storage unit 36, also completely carried by movable member 128. As described above, the electrical energy stored in storage unit 36 may be utilized to power actuator 446, controller 448 and/or transceiver 450 (described above) which may also be carried by member 128.

As schematically shown by FIG. 6, electrical generator 522 may be utilized in place of electrical generator 32 or 132 in any of the above described harvesters. In the example illustrated, electrical generator 532 is illustrated as being wholly supported upon and carried by movable member 128, wherein movable member 128 is to be reciprocated by primary power source and drive 124 in the direction indicated by arrows 38 as described above and wherein the electrical energy provided by generator 532 is stored in the storage unit 36, also completely carried by movable member 128. As described above, the electrical energy stored in storage unit 36 may be utilized to power actuator 446, controller 448 and/or transceiver 450 (described above) which may also be carried by member 128.

As schematically shown by FIG. 6, electrical generator 532 comprises reciprocating guide 540, magnet 542 and electrically conductive coil 544. Reciprocating guide 540 supports and guides reciprocating movement of magnet 542 in the direction indicated by arrows 546. In one implementation, reciprocating guide 540 comprises a tube or sleeve in which magnet 542 slides in a reciprocating manner. In another implementation, guide 540 may comprise one or more rods or shafts extending through magnet 542 and along which magnet 542 reciprocates. In still other implementations, guide 540 may comprise a tongue or groove or other form of track along which reciprocating movement of magnet 542 is guided.

Magnet 542 comprises a magnet that creates a magnetic field that contains coils 544. Coil 544 comprises electrically conductive coils, such as copper wiring, that extend alongside or encircle the path along which magnet 542 reciprocates. During reciprocation of member 128, the momentum causes magnet 542 to move along guide 540 relative to coil 544. The changing magnetic field across coil 544 creates an electrical current, generating electrical energy, which is stored by electrical storage unit 36. As should be appreciated, other electronic components, presently not shown, may be additionally provided as part of electrical generator 532 to enhance electrical energy generation and storage.

Although electrical generator 532 is illustrated as using the reciprocation of member 128 to reciprocate magnet 542 relative to coil 544, in other implementations, this relationship may be reversed. For example, in other implementations, electric generator 532 may use the reciprocation of member 128 to reciprocate an electrically conductive coil through an electric field of magnet 542 to create electric current which is stored by electrical storage unit 36. Although both magnet 542 and coil 544 are illustrated as being supported and carried by movable member 128, in other implementations, one of magnet 542 and coil 544 may be carried by member 128 while the other of magnet 542 and coil 544 or supported by a frame, chassis or other structure of the harvester 520 relative to which member 128 moves. For example, in one implementation, opposite ends of guide 540 may be secured to member 128 and the surrounding chassis of harvester 520, wherein the magnet 542 moved relative to and adjacent coil 544.

Figure 7:
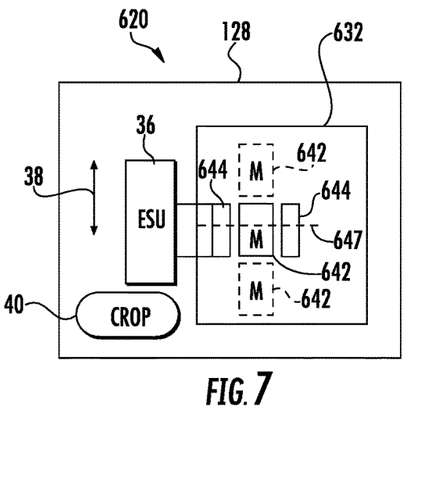
FIG. 7 is a top view schematically illustrating another example harvester with an example electrical generator.
Figure 8:
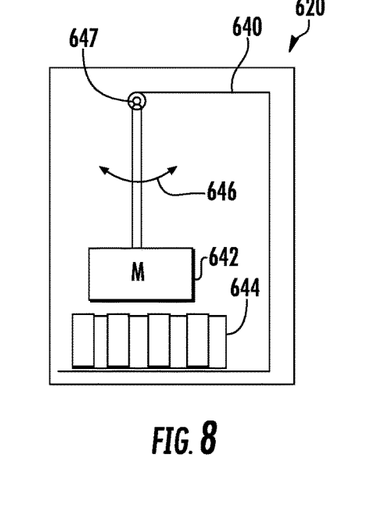
FIG. 8 is a side view schematically illustrating the example electrical generator of FIG. 7.

FIGS. 7 and 8 are schematic diagrams of a portion of another harvester 620 comprising an example electrical generator 632. Electrical generator 632 may be utilized in place of electrical generator 32 or 132 in any of the above described harvesters. In the example illustrated, electrical generator 632 is illustrated as being wholly supported upon and carried by movable member 128, wherein movable member 128 is to be reciprocated by primary power source and drive 124 in the direction indicated by arrows 38 as described above and wherein the electrical energy provided by generator 632 is stored in the storage unit 36, also completely carried by movable member 128. As described above, the electrical energy stored in storage unit 36 may be utilized to power actuator 446, controller 448 and/or transceiver 450 (described above) which may also be carried by member 128.

As schematically illustrated by FIGS. 7 and 8, electrical generator 632 comprises pendulum 640, magnet 642 and electrically conductive coil 644. Pendulum 640 (shown in FIG. 8) supports and guides reciprocating swinging arcuate movement of magnet 642 in the direction indicated by arrows 646 about axis 647.

Magnet 642 comprises a magnet that creates a magnetic field that is moved relative to coil 544 by the swing motion of pendulum 640. Coil 644 comprises electrically conductive coils, such as copper wiring, that extend beneath or alongside the arcuate path along which magnet 642 swings. During reciprocation of member 128, the momentum causes magnet 642 to swing relative to coil 644 to the position shown in broken lines in FIG. 7. The changing magnetic field across coils 644 creates an electrical current, generating electrical energy, which is stored by electrical storage unit 36. As should be appreciated, other electronic components, presently not shown, may be additionally provided as part of electrical generator 632 to enhance electrical energy generation and storage.

Although electrical generator 632 is illustrated as using the reciprocation of member 128 to swing magnet 642 relative to coil 644, in other implementations, this relationship may be reversed. For example, in other implementations, electric generator 632 may use the reciprocation of member 128 to swing and electrically conductive coil through an electric field of magnet 642 to create electric current which is stored by electrical storage unit 36. Although both magnet 642 and coil 644 are illustrated as being supported and carried by movable member 128, in other implementations, one of the pendulum 644 supporting magnet 642 and coil 644 may be carried by member 128 while the other of the pendulum 644 supporting magnet 642 and coil 644 may be supported by a frame or other structure of the harvester 620 relative to which member 128 moves.

Figure 9:
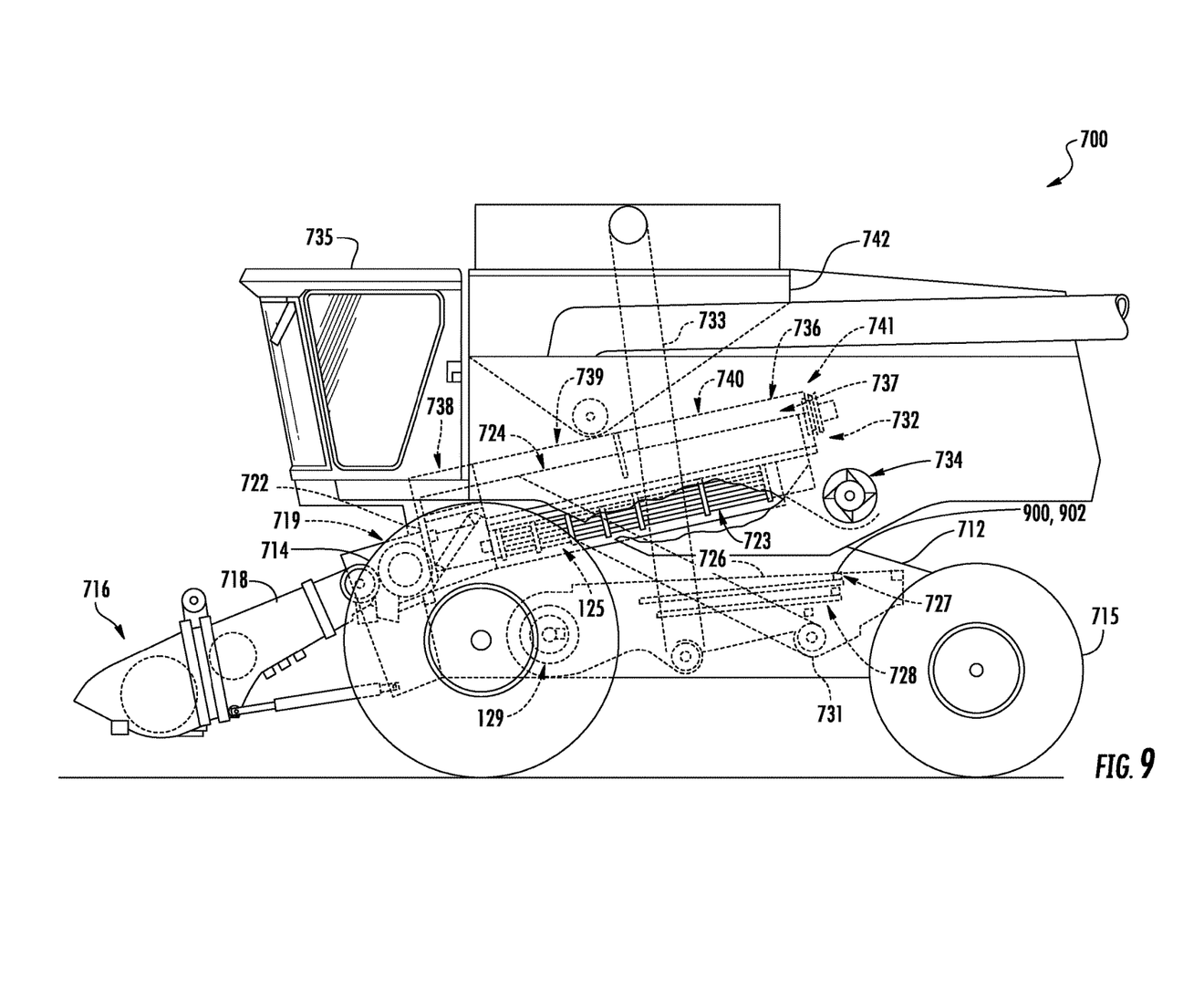
FIG. 9 is a side view of another example harvester providing local electrical power generation and use.

FIGS. 9-14 illustrate harvester 700, an example of harvesters 20, 120, 220, and 420 described above. As shown by FIG. 9, harvester 700 comprises a main frame 712 having wheel structure including front and rear ground engaging wheels 714 and 715 supporting the main frame for forward movement over a field of crop to be harvested. The front wheels 714 are driven by an electronically controlled hydrostatic transmission.

A vertically adjustable header or harvesting platform 716 is used for harvesting a crop and directing it to a feeder house 718. The feeder house 718 is pivotally connected to the frame 712 and includes a conveyor for conveying the harvested crop to a beater 719. The beater 719 directs the crop upwardly through an inlet transition section 722 to a rotary cleaning and separating assembly 724. In other implementations, other orientations and types of cleaning structures and other types of headers 716, such as transverse frame supporting individual row units, are utilized.

The rotary cleaning and separating assembly 724 threshes and separates the harvested crop material. Grain and chaff fall through a concave 725 and separation grates 723 on the bottom of the assembly 724 to a cleaning system 726, and are cleaned by a chaffer 727, sieve 728 and air fan 729. The cleaning system 726 removes the chaff and directs the clean grain to elevator 733. Clean grain elevator 733 conveys the grain to tank 742. The clean grain in the tank 742 can be unloaded into a grain cart or truck by unloading auger. Tailings fall into the return elevator or auger 731 and are conveyed to the rotor 737 where they are threshed a second time.

Threshed and separated straw is discharged from the rotary cleaning and separating assembly 724 through an outlet 732 to a discharge beater 734. The discharge beater 734, in turn, propels the straw out the rear of the combine. It should be noted that the discharge beater 734 could also discharge crop material other than grain directly to a straw chopper. The operation of the combine is controlled from an operator's cab 735.

In the example illustrated, the rotary cleaning and separating assembly 724 comprises a cylindrical rotor housing 736 and a rotor 737 located inside the housing 736. The front part of the rotor and the rotor housing define the infeed section 738. Downstream from the infeed section 738 are the cleaning section 739, the separating section 740 and the discharge section 741. The rotor 737 in the infeed section 738 is provided with a conical rotor drum having helical infeed elements for engaging harvested crop material received from the beater 719 and inlet transition section 722.

In the cleaning section 739, the rotor 737 comprises a cylindrical rotor drum having a number of cleaning elements, sometimes referred to as rasping bars, for cleaning the harvested crop material received from the infeed section 738. Downstream from the cleaning section 739 is the separating section 740 wherein the grain trapped in the threshed crop material is released and falls to the cleaning system 728.

Figure 10:
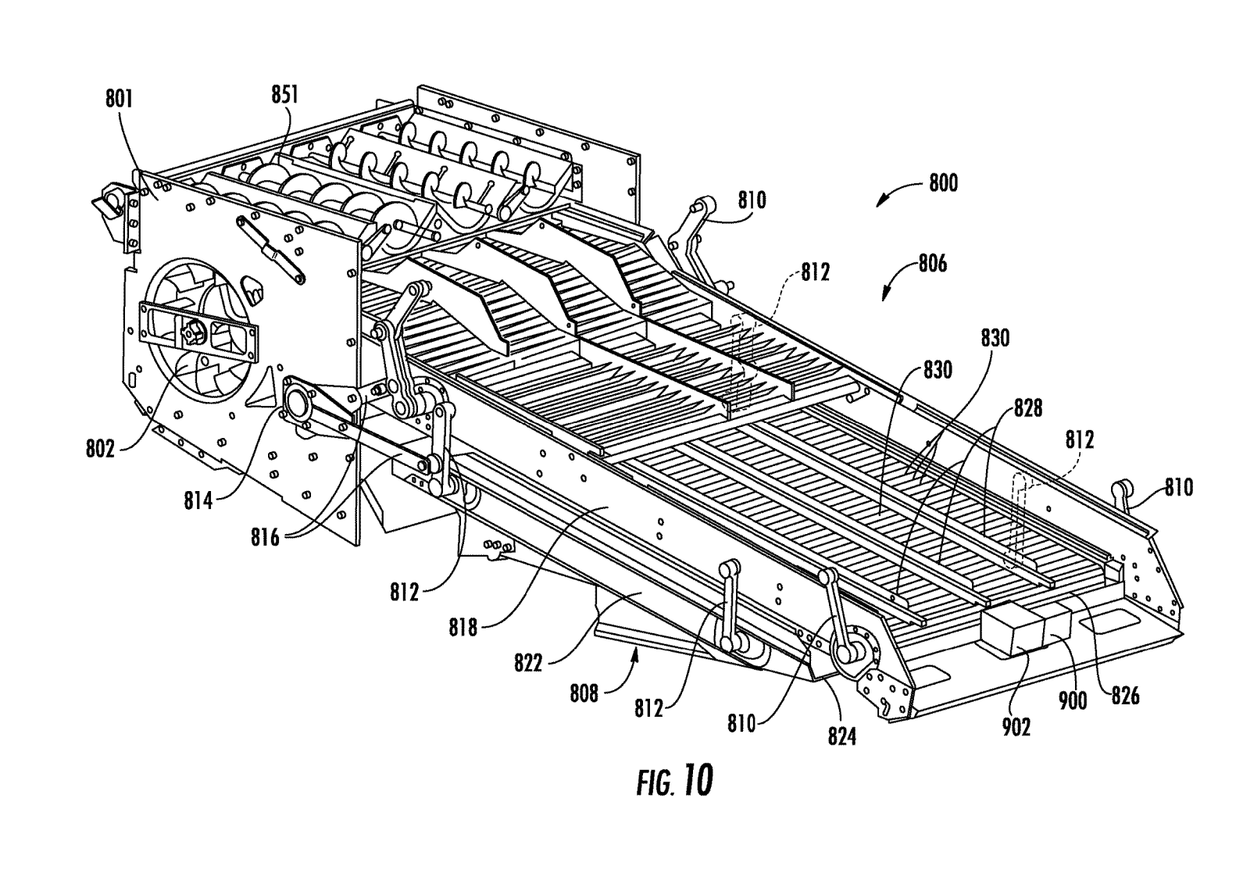
FIG. 10 is a perspective view of an example shoe of the example harvester of FIG. 9.

FIG. 10 is a perspective view of an example cleaning shoe 800 of cleaning system 726. Cleaning shoe 800 comprises housing 801, a fan 802, a housing 804, an upper sieve assembly 806, a lower sieve assembly 808, hangers 810, hangers 812, a motor 814, and a drive crank 816. Housing 801 comprise a structure that supports fan 802 and motor 814. Fan 802 extends laterally across substantially the entire width of the cleaning shoe. Fan 802 generates an airflow that travels rearward toward the upper sieve assembly 806 and the lower sieve assembly 808. This air is conveyed upward through the upper sieve assembly 806 and the lower sieve assembly 808, levitating material other than grain such as straw and chaff and carries the straw and chaff rearward and out of the agricultural harvester.

The upper sieve assembly 806 comprises a frame 818 that is generally rectangular and an upper sieve 820 that is supported in the frame 818. The lower sieve assembly 808 comprises a frame 822 and a lower sieve 824 that is supported in the frame 822. Upper sieve 822 and lower sieve 824 each comprise a rectangular frame 826 and supports 828 supporting a fore-and-aft extending array of laterally extending louvers 830. Each of louvers 830 is pivotally supported by frame 826 and supports 828 to pivot or rotate about their respective longitudinal and laterally extending axes.

Each hanger 810 has an upper end and a lower end. The upper end is pivotally coupled to the chassis (not shown) of the agricultural harvester. The lower end is pivotally coupled to the upper sieve assembly 806. By this arrangement, the upper sieve assembly 806 is suspended to pivot or reciprocate generally fore and aft in response to reciprocating motion provided by motor 814 and crank 816. In one implementation, motor 814 rotatably drive crank 816 at a speed of between 260 and 320 revolutions per minute. The hangers 810 are disposed in a generally rectangular arrangement, to support the left front, left rear, right front, and right rear of the upper sieve assembly 806. Thus, the hangers 810 are disposed at and support the upper sieve assembly 806 at the four corners of the upper sieve assembly 806 disposed at and support the upper sieve assembly 806 at the four corners of the upper sieve assembly 806.

Each hanger 812 has an upper end and a lower end. The upper end is pivotally coupled to the chassis (not shown) of the agricultural harvester. The lower end is pivotally coupled to the lower sieve assembly 808. By this arrangement the upper sieve assembly 806 is suspended to pivot and reciprocate generally fore-and-aft. The hangers 812 are disposed in a generally rectangular arrangement to support the left front, left rear, right front, and right rear of the lower sieve assembly. Thus, the hangers 812 are disposed at and support the lower sieve assembly 808 at the four corners of the lower sieve assembly 808.

Figure 11:
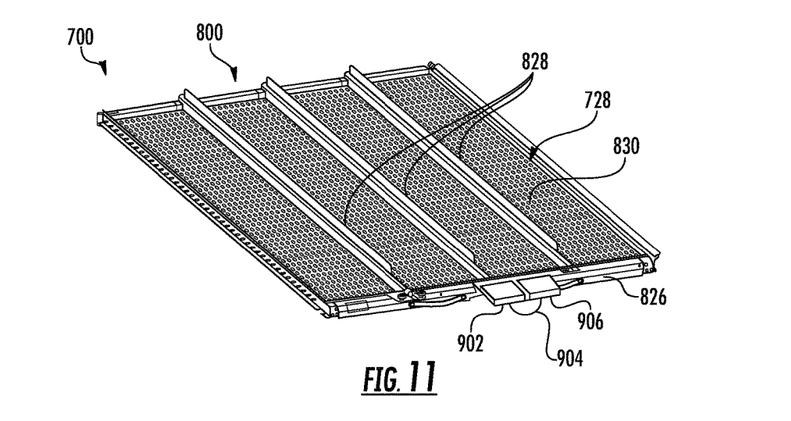
FIG. 11 is a perspective view of an example of sieve assembly of the example shoe of FIG. 10.
Figure 12:
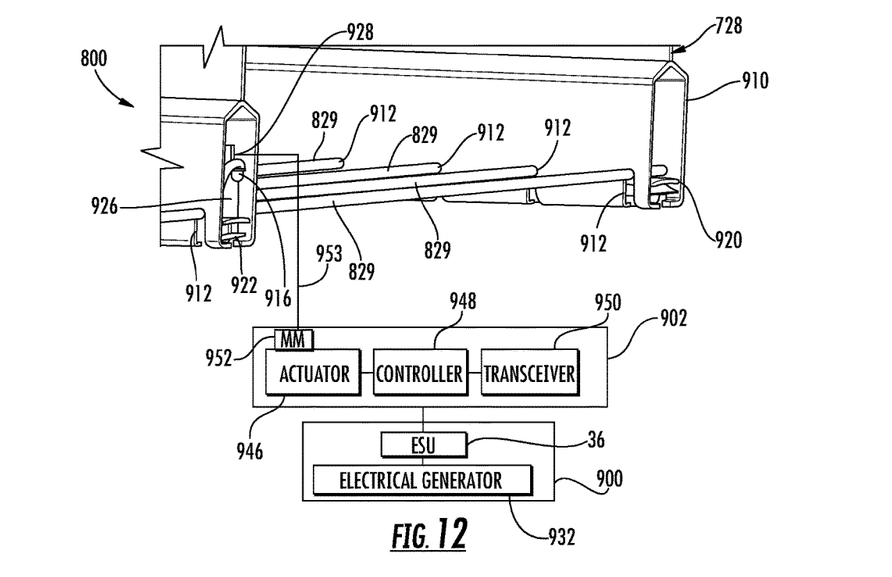
FIG. 12 is a fragmentary sectional view of a portion of the upper sieve assembly of FIG. 11 with portions schematically illustrated.

FIGS. 11 and 12 illustrate portions of upper sieve assembly 806 in more detail. Upper sieve assembly 806 comprises frame 826, supports 828, louver wires 829 (shown in FIG. 12), louvers 830, power generation unit 900 and louver actuation unit 902. FIG. 12 illustrates example supports 828 and example louver wires 829 in more detail with louvers 830 being omitted for purposes of illustration. In the example illustrated, each support 828 comprises a channel member 910 having multiple slots 912 which rotatably receive louver wires 829. Each louver wire 829 comprises a lever portion 916 which rises up and which is received within the interior of each channel member 910. In the example illustrated, each louver wire 829 and associated lever portion 916 is retained within channel member 910 by an underlying support plate 920, wherein a spring member 922 resiliently urges the support plate 920 against the underside of each of louver wires 829 against the top of each slot 912.

As further shown by FIG. 12, channel member 910 of at least one of supports 828 houses in adjustment arm 926. The adjustment arm comprises a plurality of slots 928 spaced along its length corresponding to the spacing of louver wires 829. Each of slots 928 receives a corresponding one of louver wires 829. To adjust the angular orientation of each of louvers 830, adjustment arm 926 is linearly driven or moved along and within channel member 910, engaging lever portion 916 and rotating louver wires 829. It should be appreciated that FIG. 12 illustrates just one example of a support 128 and a mechanism (adjustment arm 228) that may be utilized to support louvers 830 as well as selectively adjust the angular orientation of louvers 830. In other implementations, louvers 830 may be supported and may be selectively rotated or angularly adjusted by other mechanisms.

Power charging or generation unit 900 locally generates electrical power, using the reciprocating motion imparted to upper sieve assembly 806 by motor 814 and crank 816, and storing such generated electrical power for use by louver actuation unit 902. As shown by FIG. 11, power generation unit 900 is mounted to frame 826 of upper sieve assembly 728 so as to be carried by upper sieve assembly 728 and so as to reciprocate with the reciprocation of upper sieve assembly 728. As schematically shown by FIG. 12, power generation unit 900 comprises electrical generator 932 and electrical storage unit 36 (described above).

Electrical generator 932 is similar to electrical generator 32 described above. Electrical generator 932 comprises a device or system that captures and converts the reciprocating motion of upper sieve assembly 728 into electrical energy. In the example illustrated, electrical generator 932 is completely carried and supported by frame 826 of upper sieve assembly 728. For example, in one implementation, electrical generator 932 comprises a magnet and an electrically conductive coil, both of which are carried and supported by frame 826, wherein one of the magnet and electrically conductive coil is movable relative to the other of the magnet and the electrically conductive coil in response to momentum of the reciprocating forces resulting from the reciprocation of frame 826 and upper sieve assembly 728. In other implementations, electrical generator 932 may be partially carried by frame 826, wherein electrical generator 932 comprises a magnet and electrically conductive coil, wherein one of the magnet and the electrically conductive coil is carried by the frame 826 and the other of the magnet and the electrically conductive coil is supported by a frame or other structure of harvester 700 that is stationary relative to frame 826 as frame 826 is reciprocating.

In one implementation, electrical generator 932 is similar to electrical generator 532 described above. In yet another implementation, electrical generator 932 is similar to electrical generator 632 described above. In still other implementations, electrical generator 932 may comprise other electric generators that convert emotional momentum into electrical current and political power.

Louver actuation unit 902 comprises a device that adjusts the angular orientation or positioning of louvers 830. As shown by FIG. 11, louver adjustment unit 902 is mounted to frame 826 of upper sieve assembly 728 so as to be carried by upper sieve assembly 728 and so as to reciprocate with the reciprocation of upper seven assembly 728. Louver adjustment unit 902 receives power from power generation unit 900 by an electrical harness 904. As schematically shown by FIG. 12, louver adjustment unit 902 comprises actuator 946, controller 948 and transceiver 950.

Figure 13:
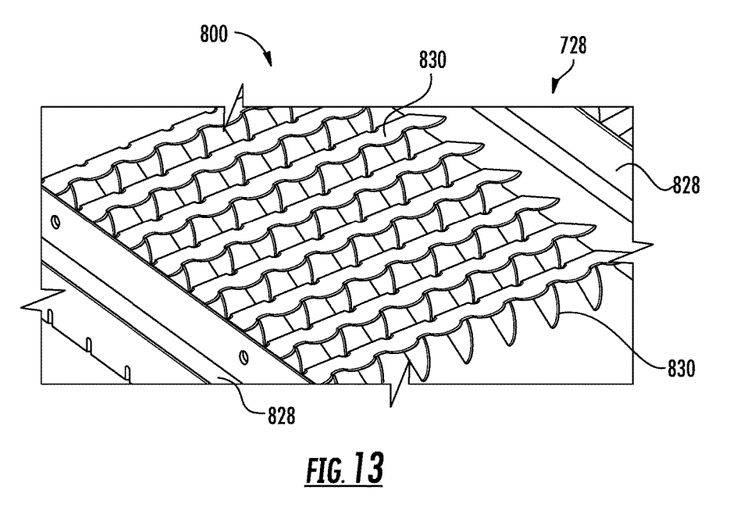
FIG. 13 is a fragmentary top perspective view of example louvers rotated to a first angular orientation.
Figure 14:
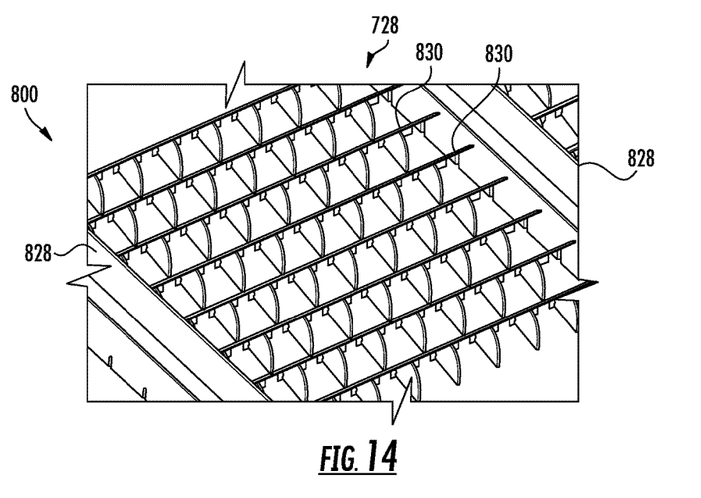
FIG. 14 is a fragmentary top perspective view of the example louvers rotated to a second angular orientation.

Actuator 946 comprises a device that adjusts the angles of louvers 830. Actuator 946 comprises a movable member 952 that is driven by actuator 946. In the example illustrated, the movable member 952 of actuator 446 is powered and driven using the energy from electrical storage unit 36. As schematically illustrate by line 953, movable member 952 is operably connected to adjustment arm 926 so as to linearly move adjustment arm 926 and thereby rotate louver wires 829 to rotate louvers 830. FIGS. 13 and 14 illustrate example louvers 830 rotated to different angular positions by actuator 946.

Controller 948 comprises electronics that control the operation of actuator 946. In one implementation, controller 948 comprises an integrated circuit, such as an application-specific integrated circuit that carries out logic in controlling actuator 946 to change the angular positioning orientation of louvers 830. In one implementation, controller 948 comprises computer hardware, such as a processing unit and associated instructions stored in a non-transitory computerize readable medium, wherein the instructions direct the processing unit to output control signals to actuator 4946, causing actuator 446 to movable member 952 so as to adjust the angular orientation of louvers 830. In one implementation, controller 948 receives and utilizes the locally generated electrical energy stored in electrical storage unit 36. In some implementations, controller 948 may be omitted.

Transceiver 950 comprises a communication device that facilitates communication between controller 948 and a remote transceiver, such as transceiver 152, proximate to cab 735 (shown in FIG. 9). Transceiver 950 facilitates the transmission of commands, inputs or selections from a remote location, such as from a cab or control counsel associated with harvester 420. In one implementation, transceiver 950 further facilitates the transmission of sensor signals indicating various operational states of other components of harvester 700, environmental conditions or characteristics of the grain or crop being harvested. In one implementation, transceiver 950 comprises a wireless transceiver, facilitating the transmission of such controller data signals. Such wireless transmission provided by transceiver 950 facilitates communication between controller 948 and transceiver 152 across the dynamic gap adjacent upper sieve assembly 728. In one implementation, transceiver 950 is electrically connected to electrical storage unit 36 so as to receive and utilize the locally generated electrical power stored in a storage unit 36. In some implementations, transceiver 950 may comprise a wired transceiver or may be omitted.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A harvester comprising:
   a reciprocating member to engage a crop;
   an electrical generator to convert reciprocating motion of the reciprocating member into electrical energy, and
   an electrical storage unit storing the electrical energy.

2. The harvester of claim 1 further comprising an actuator to adjust an operating parameter of the reciprocating member, the actuator having a movable member driven by the electrical energy.

3. The harvester of claim 2, wherein the reciprocating member comprises one of a chafer and a sieve, having louvers, wherein the actuator is coupled to the louvers to rotatably drive the louvers using the electrical power.

4. The harvester of claim 2 further comprising:
   a controller to control the actuator; and
   a transceiver providing wireless communication to the control, the controller and the transceiver being powered by the electrical energy.

5. The harvester of claim 1, wherein the electrical generator is completely carried by the reciprocating member.

6. The harvester of claim 1, wherein the reciprocating member comprises a cleaning mechanism of the harvester.

7. The harvester of claim 1, wherein the electrical generator comprises a slidable magnet that slides in response to reciprocation of the reciprocating member.

8. The harvester of claim 1, wherein the electrical generator comprise a pendulum carried by the reciprocating member.

9. The harvester of claim 1, wherein the reciprocating member comprises a cleaning mechanism having a first set of louvers and a second set of louvers and wherein the harvester further comprises:
   a first actuator to rotate the first set of louvers; and
   a second actuator to rotate the second set of louvers, each of the first actuator and the second actuator having a movable member driven by the electrical energy.

10. A harvester comprising:
    a first movable member to engage a crop;
    an electrical generator at least partially carried by the first movable member to generate electrical energy from movement of the first movable member;
    a second movable member carried by the first movable member; and
    an actuator to drive movement of the second movable member using the electrical energy.

11. The harvester of claim 10, wherein the first movable member comprises a reciprocating cleaning mechanism and wherein the second movable member comprises a rotatable louver of the cleaning mechanism.

12. The harvester of claim 10 further comprising:
    a controller to control the actuator, the controller carried by the first movable member, and
    a transceiver providing wireless communication to the control.

13. The harvester of claim 12, wherein the controller and the transceiver are powered by the electrical energy.

14. The harvester of claim 10, wherein the electrical generator is completely carried by the first movable member.

15. A method comprising:
    moving a first movable member of a harvester to interact with a crop,
    generating electrical energy from conversion of motion of the first movable member; and
    moving a second movable member carried by the first movable member using the generated electrical energy.

16. The method of claim 15, wherein the first movable member comprises a reciprocatable cleaning mechanism and wherein the second movable member comprises a rotatable louver of the cleaning mechanism.

17. The method of claim 15, wherein the first movable member comprises a reciprocatable member and wherein the electric energy is generated using a pendulum carried by the reciprocatable member.

18. The method of claim 15 adjusting positioning of the second movable member with an actuator, a transceiver that receives wireless control signals and a controller that controls positioning of the second movable member using the actuator and based upon the wireless control signals, wherein at least one of the actuator, the controller and the transceiver is powered by the generated electrical energy.

19. The method of claim 15, wherein the electric energy is generated by an electrical generator completely carried by the first movable member.

20. The method of claim 15 further comprising adjusting an operational parameter of the second movable member using the generated electrical energy.

* * * * *